Figure 6:
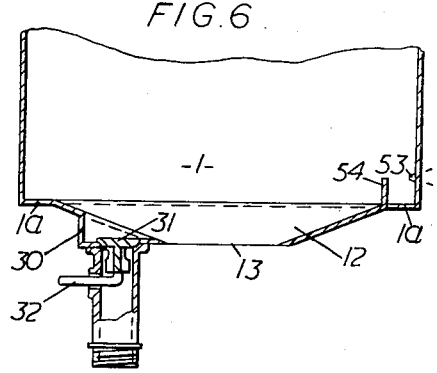

July 10, 1962 L. B. BALSHAW 3,043,724
METHOD OF WASHING GLASSES OR THE LIKE
Filed April 24, 1958 5 Sheets-Sheet 1
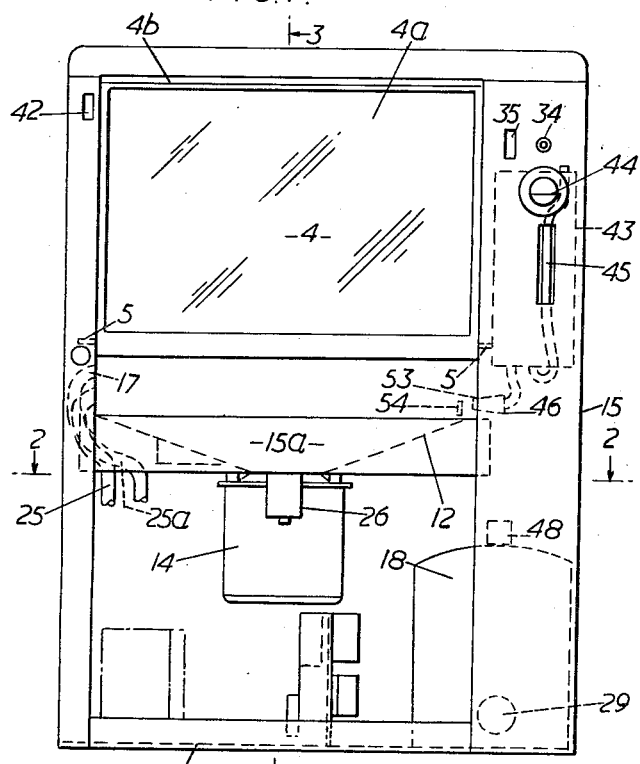
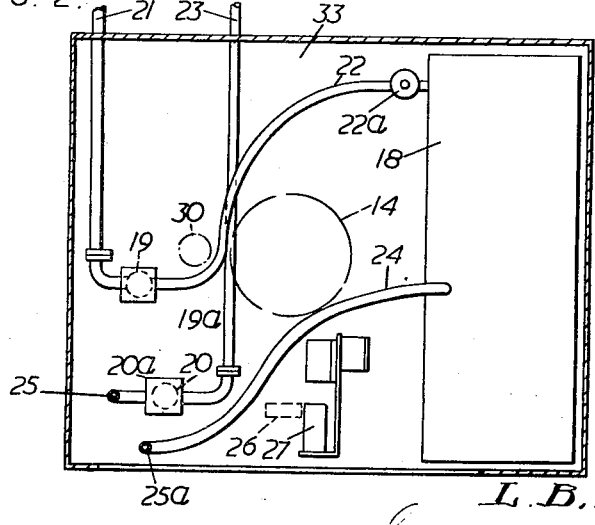
Inventor
L. B. Balshaw
By
Attorneys July 10, 1962 L. B. BALSHAW 3,043,724
METHOD OF WASHING GLASSES OR THE LIKE
Filed April 24, 1958 5 Sheets-Sheet 2
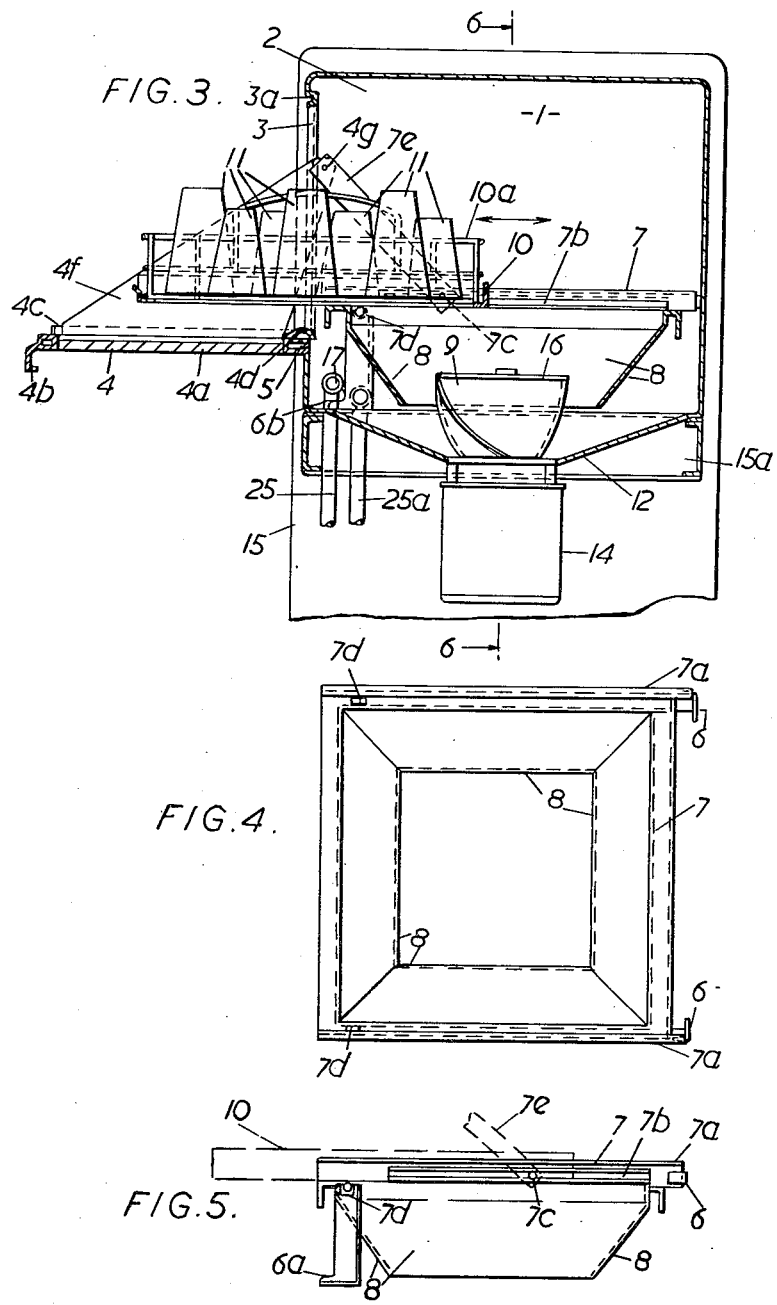
Inventor
L. B. Balshaw
By
Glascock Downing Seebold
Attorneys July 10, 1962  L. B. BALSHAW  3,043,724
METHOD OF WASHING GLASSES OR THE LIKE
Filed April 24, 1958  5 Sheets-Sheet 3

Inventor
L. B. Balshaw
By
Glascock Downing Seebold
Attorneys

July 10, 1962  L. B. BALSHAW  3,043,724
METHOD OF WASHING GLASSES OR THE LIKE
Filed April 24, 1958                         5 Sheets-Sheet 5

Inventor
L. B. Balshaw
By:
Glascock Downing Leebold
Attorneys

United States Patent Office 3,043,724
Patented July 10, 1962

3,043,724
METHOD OF WASHING GLASSES OR THE LIKE
Leonard Bunn Balshaw, Stokes Valley, Wellington, New Zealand, assignor to Dishmaster Appliances Limited, Petone, New Zealand, a New Zealand company
Filed Apr. 24, 1958, Ser. No. 730,698
3 Claims. (Cl. 134—25)

This invention relates to methods of washing glasses and/or dishes and has been particularly though not solely devised for use in washing glasses in hotel bars and the like places.

When a glass washing machine is used, for example, in a hotel bar, batches of glasses are, of course, constantly being washed, and the glasses are then reused. It is, of course, most desirable for hygienic reasons that the glassware should be sterilized, or substantially so. In order to ensure this, various health authorities give time and temperature requirements for the washing of the glasses. In some cases this requirement is enforced as a law, and in some cases a thermometer or the like instrument is required to be placed in the washing chamber to indicate the temperature of the washing water. However, with glass washing machines as at present constructed and used because of the high washing temperature, the glasses are heated considerably, and are unsatisfactory for use for a period of perhaps a half, or even three quarters of an hour after washing. This is, of course, extremely disadvantageous since after washing, the glasses must be stored, taking up considerable storage space which is valuable, and also necessitating larger stocks of glasses than would otherwise be necessary.

It is, therefore, an object of the present invention in one aspect to provide a method of washing glasses which will obviate or minimize the above disadvantage.

Accordingly in this aspect the invention consists in a method of washing glasses and/or dishes comprising the steps of washing the glasses with a hot cleansing liquid, and rinsing the washed glasses and/or dishes with water at a suitable temperature, the temperatures and durations of the washing and rinsing cycles being arranged so that after the glasses and/or dishes are washed and rinsed, the glasses are cooled to a temperature such that sufficient residual heat is left in the glasses to dry them by evaporation in a reasonable period to a stage ready for use while the time for cooling the glasses to a satisfactorily low temperature is materially reduced.

A dish washing machine that may be used in practicing the invention will now be described with reference to the accompanying partly diagrammatic drawings, in which:

FIGURE 1 is a front elevation of a glass washing machine according to the invention, with the lower front cover plate removed, some parts being removed for clarity.

Figure 7:
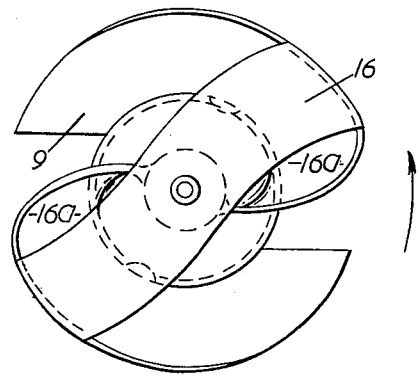
Figure 8:
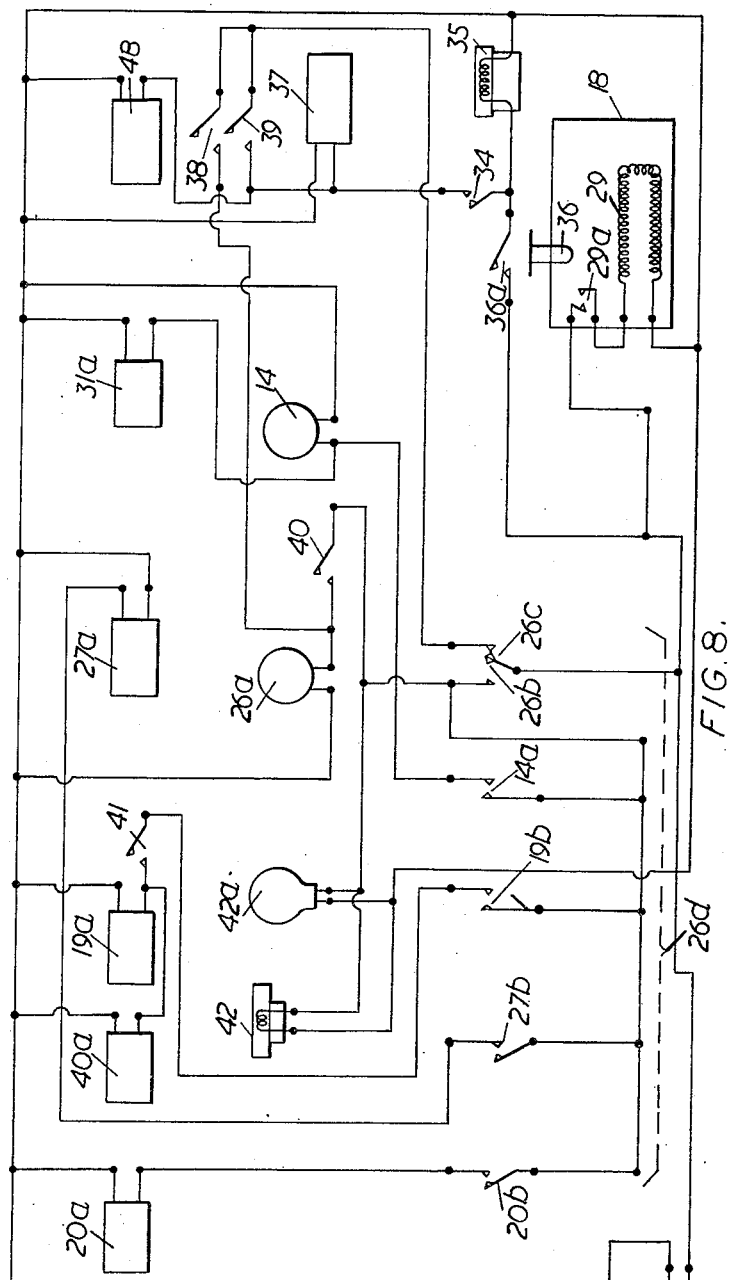
Figure 9:
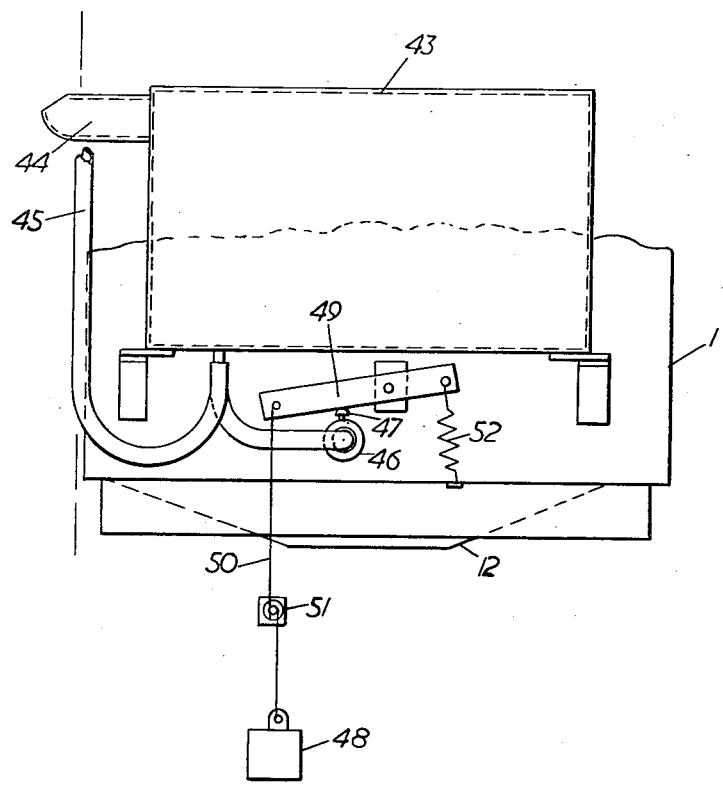

FIGURE 2 is a diagrammatic horizontal section on the plane 2—2, FIGURE 1, through the lower part of the machine, showing the general arrangement of the supply and control components, FIGURE 3 is a vertical section on the plane 3—3, FIGURE 1, with the door open and the sliding tray and contents projected, only the upper part of the machine being shown, FIGURE 4 is a plan of the baffle means, FIGURE 5 is a side elevation thereof, the sliding tray and link being shown dotted, FIGURE 6 is a vertical section through the lower part of the tank or bowl, on the plane 6—6, FIGURE 3, with the impeller and associated motor removed, the drain valve being shown, FIGURE 7 is a plan of the impeller on a larger scale, showing the deflector plate thereon, FIGURE 8 is a circuit diagram showing the circuit arrangement of the machine, and FIGURE 9 is a diagrammatic side elevation of the detergent supply system.

In the construction shown in the drawings, a glass washing chamber 1 is provided having an upper portion 2 which is substantially rectangular, and with a front opening 3 which is substantially vertical. In the front opening 3 a door 4 having a glass or other transparent front panel 4a is hinged at 5 by its lower side. The door is provided with a handle 4b, and on its inner side has a sealing fin 4c around three sides adapted to engage in a corresponding sealing groove 3a around the corresponding three sides of the opening 3. At the lower side of the door is provided a sealing shroud 4d which, when the door is closed forms a leak stop against the lower side of the opening 3.

Catch means of any suitable type can be employed to hold the door closed, and when open the door projects substantially horizontally outwards as shown in FIGURE 3.

Brackets 6 project inwardly from the rear ends of the side runners 7a of a baffle frame 7 and are screwed to the back of the chamber 1 so as to support the rear of the frame when placed in the chamber. The frame 7 is of rectangular shape and has dependent stationary baffles 8 which are inclined inwards towards and around the upper part of an impeller 9 to be hereinafter described. The front of the frame is supported by feet 6a fitting in brackets 6b on the floor of the chamber 1. The door 4 is provided on each side thereof with an arm 4f comprising a triangular sheet of metal suitably attached at right angles to the plane of the door, and being provided with an arm pivot point 4g disposed 9¾ inches away from the plane of the door, and a line between this pivot point at right angles to the plane of the door, being disposed 1⅛ inches from the centre of the door hinges.

To provide a rack or the like means comprising a sliding shelf within the body of the chamber 1, the runners 7a on each side of the baffle frame have longitudinal flanged slots 7b therein within which rollers 7c run, these rollers 7c carrying the sliding tray 10. In addition further fixed rollers 7d are provided near the door, which fixed rollers engage with the sliding tray 10. The axle carrying the rollers 7c also carries pivotal links 7e, connected at their opposite ends to the arm pivot point 4g above mentioned. The links 7e are such that the distance between the pivots at either end thereof is 8 inches. The rollers 7c are positioned so that when the door 4 is opened and the sliding tray 10 withdrawn to its fullest extent from within the glass washer, the axle of the roller 7c is 5½ inches within the glass washer chamber 1 from the front wall thereof against which the door hinge pin fits. Furthermore the axle of roller 7c is arranged so that a horizontal line therethrough lies 2⅝ inches above the door hinge pin 5.

The sliding tray is completed between the runners in any convenient manner.

The use of this construction is as follows. It will be assumed that the door 4 is closed in which event the front of the shelf is resting near to or against the inner surface of the door. If now the door is opened, the arrangement of the hinge pin 5 of the door 4, the arm pivot 4g on the arm 4f and the roller pivot 7c at the opposite end of the link 7e is such that the arm pivot passes from the lower side of a line connecting the hinge pin 5 to the roller pivot 7c to the upper side of such a line. As a result of this it will be appreciated that during initial opening of the door the distance between the hinge pin 5 and the roller pivot 7c will increase until the arm pivot 4g moves over the said line, and then the distance will decrease as the door is opened further and the roller pivot 7c will advance towards the front of the cabinet, carrying with it the sliding shelf 10 moving this outwardly as the door is opened. Because of this linkage arrangement the door will not foul the shelf or vice versa.

When closing the reverse action occurs, the door 4 moving the shelf 10 into the chamber 1 until the door is nearly closed when the door and the shelf move towards each other so as to position the shelf in the desired position within the chamber 1.

On the sliding shelf 10 can be placed a basket 10a containing inverted glasses 11 for washing.

Both the shelf 10 and the bottom of the basket 10a are of extremely open construction to allow ready access of water to the interior of the glasses.

The lower part 12 of the washing chamber is made substantially in the form of a frustrum of a cone, the larger diameter being shaped to suit the square or rectangular shape of the lower side of the upper portion 2 of the chamber. The smaller diameter 13 of the frustrum is of a shape to receive a mounting for the rotary impeller 9 which is driven by an electric motor 14 controlled by switch 14a, FIGURE 8. The washing chamber rests by its flat under-surfaces 1a on a rectangular open frame 15a fixed within the outer cabinet 15.

The impeller 9 is of a known shape in dishwashing machines, which shape has been found particularly efficacious in slinging water from the tips of the blades of the impeller at high velocity for washing purposes. An S-shaped flat plate 16 forming part of the baffle means is fixed to the top of the impeller so as to leave openings 16a for a part of the water scooped up by the impeller to pass upwards, the effect of the plate being to choke the upward flow to a desired degree so that some water is thrown outwards to hit the inside of the baffles 8, and be so deflected as to give varying angles of impact on the glasses, thus more thoroughly washing the same. This forms a feature of the invention.

A water inlet 17 is provided into the lower part of the chamber 1, and the said inlet has a bend at its top.

The machine also embodies a booster tank 18, valves 19 and 20 controlled by solenoids 19a and 20a operated by switches 19b and 20b (FIGURE 8), and piping 21, 22, 23, 24, 25 and 25a. The pipe 22 also incorporates a valve 22a. Automatic control means comprising an automatic timer 26, are provided as are a time-lag mechanism 27, a thermostat 36 (see FIGURE 8) and a capillary tube (now shown) to the booster tank.

The timer 26 has a motor 26a controlled by a switch 26b and has a series of cams (not shown) of any suitable type to control switches in the necessary sequence as desired so as to give the required washing and rinsing cycles. Such control details are not shown since they will be obvious to any person skilled in the art.

The timer motor also has an auxiliary start switch 26c.

The pipe 21 is for connection to an extraneous source of hot water supply, and the hot water from the extraneous source passes through the valve 19 and pipe 22 and valve 22a into the booster tank where it is boosted by the heating element 29 controlled by a thermostat 29a (FIGURE 8).

The pipe 23 is for connection to an extraneous source of cold water supply, and cold water passes from the said pipe through the valve 20 and pipe or tube 25 into the chamber 1.

The pipe 24 supplies water at a boosted temperature from the top of the tank 18 to the pipe or tube 25a which admits water into the tank independently of the pipe or tube 25.

A drain 30 is provided from the bottom of the chamber 1 and is fitted with a drain valve 31 of a similar type to that employed in dish-washing machines, so that the chamber can be drained. The drain valve is operated by the inner end of a lever 32 operated by an appropriate solenoid 31a connected in parallel with the main motor 14.

The time-lag mechanism 27 may be of any suitable known type such as the longtrain unit TL 8/2 made by Rotherham & Sons, Coventry, England.

Any desired means may be employed for introducing a suitable detergent into the chamber 1 but I prefer the following construction.

A tank 43 for liquid detergent is provided with a filler 44 and a level gauge 45 on the front face of the apparatus.

A solenoid operated valve 46 is provided, e.g. a Schrader (registered trademark) Blowgun valve, the operating knob 47 of which is operated by a solenoid 48 through a lever 49 and pull wiring 50 having a clamp 51 to enable it to be adjusted. A return spring 52 is provided for the lever 49.

The nozzle 54 is provided to obviate or minimize the running of the detergent to waste through the drain 30.

The greater part of the supply and control components is mounted on a base plate 33 close to floor level.

Preferably means, e.g. a switch, in the electrical circuit, are provided to prevent the starting of the impeller, or the admission of water, until the door is closed.

Because of the nature of the articles being washed, namely glasses, the height of the washing chamber need be quite short only, and this has definite advantages in that the overall height of the unit can also be quite short, as compared with, for example, an impeller type of dishwasher in which plates, cups and other dishes are washed.

However, this advantage brings disadvantages in its train, and these disadvantages are as follows:

By comparison with a dish-washing machine of similar construction, there are no plates in the bottom of the washing chamber to act as water deflectors, and the difference in height between the impeller and the articles being washed means that water has to change direction much more quickly than in a dish-washing machine.

However, I have found that by the provision of suitable baffling means as hereinbefore described, together with the S-plate 16 on the impeller 9, an improved distribution of spray within the washing chamber 1 can be achieved.

It has been found that the above construction is particularly efficacious in diffusing and causing an even spray of water to be sprayed within the chamber 1, so that all glasses placed therein are washed substantially to the same extent. The absence of the usual impeller guard or wire mesh screen sometimes provided in dishwashing machines to guard against cutlery or the like falling on the impeller and being thrown in amongst the dishes, ensures the free passage of the water spray and improves the washing efficiency.

FIGURE 8 shows diagrammatically a number of components appearing in other figures of the drawings, and also some components which do not appear elsewhere. The latter components are well-known items in machines of this and other types, and further illustration and description is superfluous.

Referring to FIGURES 1 and 8, near the top right corner of the machine a push type momentary contact switch 34 and a pilot light 35 are fitted, the latter being preferably a red light.

Both the switch 34 and the pilot light 35 are connected to the mains via control means comprising the switch 36a of thermostat 36 which is subjected to the temperature in the booster tank. Accordingly, starting of the machine by the switch 34 is subject to the water in the booster tank being at or above a predetermined temperature, i.e. when the thermostat is open because of low temperature of the water in the booster tank the circuit through the switch 34 is broken and the said switch is thus rendered inoperative and the machine cannot be started.

If the pilot light 35 glows, this is a visual indication that the machine is ready for use. Conversely, if the light 35 does not glow then it is a visual indication that the water is not at or above the predetermined temperature and also that the machine will not respond to the operation of the starter switch 34.

When the pilot lamp 35 glows and the switch 34 is operated instantaneously power is supplied direct to the start switch control relay 37, which operates to close switches 38 and 39.

The switch 39 provides an auxiliary circuit to the relay 37 and the switch 38 controls an auxiliary circuit to the timer motor 26a.

Accordingly closing of the switches 38 and 39 consequent upon closing and opening of the switch 34, and the resultant operation of the relay 37 energizes the said solenoid through an alternative channel via switch 39 and provides power to the timer motor 26a via switch 38. Closing of switch 39 also energizes solenoid 48, opening the detergent valve 46 and admitting detergent to the chamber 1.

When the timer reaches its starting position, contacts 26c are opened, contacts 26b closed, the auxiliary circuit which includes the switch 34 broken, and the normal timer motor circuit is made. The detergent valve is closed when solenoids 37 and 48 are de-energized.

The timer 26 preferably provides a complete cycle of operations consisting of a hot wash, hot rinses and a cold rinse, in one complete revolution of its control cams.

In conjunction with the timer is an auxiliary switch 41 and a relay 40a in the circuit to the hot water solenoid 19a, the relay 40a having associated contacts 40 in the circuit to the timer motor 26a.

An interior lamp 42a may be provided, to light the interior of the washing chamber 1, for example through a window in the side thereof, and an indicator light 42 may be provided on the front panel to show that a cycle is in progress.

The switch 41 is mounted above the time-lag solenoid operating lever. Unless both switch 41 and relay 40a operate in their correct sequence, the machine will not function, irrespective of operation of the timer 26.

The time-lag solenoid 27a is controlled by switch 27b.

The bracket 26d in FIGURE 8 indicates that the switches 20b, 27b, 19b, 14a, 26b and 26c are switches automatically operated within the timer by the timer cams.

When the time lag mechanism 27 is armed, the action of the time lag lever dropping closes the switch 41, which, in conjunction with the timer switch 19b, completes the circuit to the hot water valve solenoid 19a and to relay 40a thus opening the contacts 40 which are normally closed and thus stopping the timer motor 26a. Thus, during the duration of the supply of hot water to the machine, which time will vary according to the installation and other factors, the timer motor 26a will be at a standstill.

When the time lag has operated after its predetermined delay period, the lever on rising opens switch 41 and breaks the circuit to the relay 40 and to the hot water solenoid valve 19a thus supply of hot water ceases and the power is re-supplied to the timer motor 26a.

This sequence of operations is repeated for the hot rinse cycle, except that the switch 34 does not require to be operated.

In the cold rinse cycle the time lag is not utilized and if the local water pressure is so great that an excess amount of water could be introduced into the machine in fifteen seconds, then a pressure reducer must be introduced into the supply.

The drain or dump valve 31 and impeller motor 14 are both operated by the action of the same cam, which controls the two separate circuits by switch 14a. In this way, the drain valve is always closed when the motor is running and conversely the motor is always stopped when the drain valve is open.

The hot water booster tank is wired direct to the main terminal block, and provided the machine is left plugged in will be in circuit continuously (subject to the action of its own thermostat 29a which may be set at 190° F.).

In operation, the door 4 is opened downwardly and a basket 10a loaded with glasses 11 is inserted sliding in the shelf 10. The door is then closed.

Provided that the red light 35 is glowing and the machine is accordingly ready for use, the sequence of operations is then as follows:

Press switch 34 momentarily and release.

The machine will then, without further attention, give the following cycle:

(a) Inject detergent.

(b) Hot wash with water at 190° F., occupying ten seconds plus filling time.

(c) Drain, occupying twelve seconds.

(d) Hot rinse, with water at 190° F., occupying ten seconds plus filling time, which with the washing water raises the glasses to a temperature of at least 120° F.

(e) Drain, occupying twelve seconds.

(f) Cold rinse, with water at about 60° F., occupying fifteen seconds, causing the glasses to be cooled to a temperature of about 100–110° F., which is a temperature such that sufficient residual heat is left in the glasses to dry them by evaporation in a reasonable period to a stage ready for use while the time for cooling the glasses to a satisfactorily low temperature is materially reduced. The glasses are usually ready for use in about ten to fifteen minutes which is a reasonable time.

(g) Drain, occupying five seconds.

(h) Switch off (with drain still open).

The door 4 can now be opened and the basket of glasses can be removed.

From the above, it will be seen that a complete cycle takes about sixty five seconds plus the time of filling twice with hot water, this being a variable according to local water pressure.

Preferably the overall height of the glass washing machine is about thirty-three inches, and its width may be about twenty-six inches and its depth, back to front, about twenty and a half inches.

The said glass washing machine may be so constructed and arranged that about two gallons of hot water and one gallon of cold water are used for washing and rinsing each batch of glasses.

The machine can be designed to consume about 8 amps. maximum, inclusive of the hot water boosting element 29, which may have a rating of 1500 watts. The electric motor 14 may be a ¼ H.P. motor of high starting torque-continuous rating.

In normal operation, fed from a 30 gallon hot water tank set at 190° F., the machine in its preferred form would (assuming that 30 gallons was drained completely), wash and rinse 450 glasses in thirty minutes—this assumes two minutes per cycle inclusive of water filling and loading.

The rinsing water may be at other temperatures up to 110° F., but, of course, ordinary cold water at about 60° F., is preferable.

What I claim is:

1. The method of washing glasses and the like comprising the following steps in succession:
    (a) hot wash with water and detergent at 190° F. for ten seconds;
    (b) drain for twelve seconds to dispose of wash water and detergent;
    (c) hot rinse with clear water at 190° F. for ten seconds;
    (d) drain for twelve seconds;
    (e) cold rinse with water at about 60° F. for fifteen seconds;
    (f) drain for five seconds, whereupon the glasses and the like will be clean and at a temperature suitable for immediate use.

2. A method of automatically washing glasses comprising the steps of impelling a hot cleansing liquid at high velocity and at about 190° F. against the glasses for about 10 seconds, draining for about ten seconds, and rinsing the washed glasses with water at a high velocity and at a temperature of about 60° F. for about 15 seconds, the temperature and durations of the washing and rinsing cycles being arranged so that after rinsing the glasses will have a temperature of about 100° to 110° F. but no material amount of water adhering to them.

3. A method of automatically washing glasses comprising the steps of impelling a hot mixture of water and detergent at about 190° F. against the glasses for about 10 seconds, draining for about ten seconds, and rinsing the washed glasses with water at high velocity and at a temperature of about 60° F. for about 15 seconds, the temperature and durations of the washing and rinsing cycles being adjusted so that after rinsing the glasses will have a temperature of about 100° to 110° F. but no material amount of water adhering to them.

References Cited in the file of this patent
UNITED STATES PATENTS

| | | |
|---|---|---|
| 1,458,028 | Burnham | June 5, 1923 |
| 1,719,409 | Webb | July 2, 1929 |
| 2,155,271 | Jones | Apr. 18, 1939 |
| 2,173,564 | Osuch | Sept. 19, 1939 |
| 2,197,382 | Murphy | Apr. 16, 1940 |
| 2,216,388 | Hampel | Oct. 1, 1940 |
| 2,385,264 | Ferris | Sept. 18, 1945 |
| 2,671,037 | Stoddard | Mar. 3, 1954 |
| 2,825,665 | Stoddard | Mar. 4, 1958 |
| 2,842,144 | Lyman | July 8, 1958 |